Patented Sept. 22, 1942

2,296,638

UNITED STATES PATENT OFFICE 2,296,638

HIGH SURFACE HIDING PIGMENT MATERIAL AND PROCESS OF MAKING THE SAME

Marion L. Hanahan, Wilmington, Del., assignor to E. I. du Pont de Nemours & Company, Wilmington, Del., a corporation of Delaware No Drawing. Application December 8, 1938, Serial No. 244,573

15 Claims. (Cl. 106—298)

This invention relates to the art of pigment materials. More particularly it relates to the improvement of the properties of colored pigment materials. Still more particularly it relates to the improvement of the hiding power of colored pigment materials in flat paint formulations, paper coating compositions, etc.

Tinted flat paint formulations, which are used so widely for inside painting, comprise colored pigments such as chrome greens, chrome yellows, iron blues, ultramarine blue, zinc yellows, earth colors such as iron oxides, extended colors and the like. It is commonly thought in the art that the hiding and tinting power of such colored pigments in coating compositions applied to wood, metal, paper, linoleum, oil cloth, and the like, or when used as fillers in paper, rubber, and the like, is dependent entirely upon the index of refraction, color and particle size of said pigments. I have discovered, however, that such is not the case. While such properties as index of refraction, color and ultimate particle size always do exert an effect, I have found that when the pigments are used in certain coating compositions, such as flat paint formulations and casein and starch paper coating compositions, and when used as fillers such as paper fillers, their hiding power is dependent to a certain extent on pigment oil absorption and to a remarkable and hitherto unrealized extent on a property which I call "surface hiding power" and which I shall discuss in more detail below. Pigments with high surface hiding power have hitherto been unknown. Now, however, I have discovered a process whereby the property of high surface hiding power may be imparted to colored pigment materials, thereby producing unique pigments of tremendous industrial importance. Such pigments have particularly high hiding power in flat paint formulations, and as a result can be considered to have high flat hiding power in such formulations. Furthermore, they have high opacifying power in paper, and in starch and casein coating compositions applied to the surface of paper. As a matter of fact, I have discovered that pigments having the property of high surface hiding power produce high hiding, opacifying and/or tinting in all pigment/adhesive systems in which the mean index of refraction of the adhesive system is substantially lower than 1.5. A sheet of paper, for example, can be considered to be an adhesive comprising essentially paper fiber having an index of refraction of approximately 1.53 and air of index of refraction of 1. The mean index of refraction of said adhesive is substantially lower than 1.5 and colored pigments therein having high surface hiding power are definitely better opacifying and coloring agents than are comparable prior are low surface hiding power pigments of essentially equal index of refraction, color and ultimate particle size. Again, flat paint films, in which I have found high surface hiding pigments to be so effective, comprise numerous void spaces and/or pigment/air interfaces. As a consequence, the effective mean index of refraction of the adhesive portion is substantially lower than that of the binder portion, e. g. is substantially lower than 1.5. However, I have discovered that in pigment/adhesive systems in which the effective mean index of refraction of the adhesive approximates or exceeds 1.5, such as enamel paint films in which the pigment is essentially immersed in the binder, the property of high surface hiding power does not influence the hiding power of a pigment.

For a better understanding of the characteristics desired in pigment materials used in flat paint formulations, it will be necessary to explain the various terms used herein and the method of testing employed:

Flat paint formulation

A flat paint formulation produces a dry paint film in which the binder portion is insufficient to fill all void spaces between pigment particles and which in consequence has a micro rough surface of relatively low specular reflection. Such a paint has a pigmentation in excess of about 40% by volume on the dry film and usually in excess of about 50% by volume.

On the other hand, an enamel paint formulation produces a dry paint film in which the binder portion is sufficient to fill essentially all void spaces between pigment particles and which in consequence has a micro smooth surface of relatively high specular reflection. Such a paint has a pigmentation of less than about 35% by volume on the dry film and usually less than about 30% by volume.

Hiding power

Hiding power may be defined qualitatively as that property of a paint which enables it to obliterate beyond recognition any background over which it may be spread. Mathematically, it may be expressed as square feet per gallon of paint.

It is determined by the procedure entitled "Krebs dry film incomplete hiding power" described by Henry A. Gardner in "Physical and Chemical Examination of Paints, Varnishes, Lacquers and Colors," 8th edition, January 1, 1937, pp. 45–51.

In this test the paints being studied are painted out on a surface on which a design of concentric light and dark diamonds is printed. The light and dark bands are ½" wide. Their lightness factors are 75% and 40% respectively. The area of the surface is one square foot. It is printed on heavy paper and then coated with a nitrocellulose lacquer. In applying the paint a 20 cubic centimeter Luer type glass syringe filled with the paint, and the brush also filled with the paint, are weighed together. The paint is spread uniformly over the chart with the syringe and then spread with the brush. The syringe and brush are again weighed. Several brushouts, for example, six or eight are made with a paint selected as the standard, beginning with five to seven cubic centimeters of paint and increasing the amount in increments of 0.5 to 1.0 cubic centimeters. The application of the paint by volume is merely a guide. The actual weight of the paint applied, as determined by the difference in weight of the syringe and brush before and after application, is used in the calculation. Two or three brushouts of the paints to be compared are then prepared with different quantities of paint such as 6, 7 and 8 cubic centimeters.

When dry, the brushouts are numbered consecutively in the order of increasing quantity of paint for easy identification. The sample brushouts are then located with respect to their degree of hiding by placing each of them between reference standards showing less or more hiding. If possible, the ratings should be estimated in tenths. Thus 2.4 means that the sample is located 0.4 of an interval between standards No. 2 and No. 3.

The hiding power of a paint is calculated as follows:

$$\text{Hiding power} = \frac{\text{volume of standard paint}}{\text{volume of sample paint}} \times 100$$

when the volume of standard paint is that required to give the same contrast as that given by the volume of sample paint.

The following is a specific example of a hiding power determination made by this method:

| | |
|---|---|
| Weight of standard paint per gal_____lbs__ | 15.69 |
| Weight of sample paint per gal_____lbs__ | 13.54 |
| Brushout of sample_____g__ | 5.40 |
| Brushout of standard 1_____g__ | 6.50 |
| Brushout of standard 2_____g__ | 7.40 |
| Sample rating_____ | 1.4 |

Hence, weight of standard paint of equivalent hiding is:

$$6.50 + 0.4(7.4 - 6.4) = 6.86 \text{ g.}$$

The volume of which is:

$$\frac{6.86 \times 8.33}{15.69} = 3.64 \text{ cubic centimeters}$$

The volume of the sample is:

$$\frac{5.40 \times 8.33}{13.54} = 3.32 \text{ cubic centimeters}$$

The relative hiding power of the sample is:

$$\frac{3.64}{3.32} \times 100 = 110$$

*Pigment flat hiding power*

Strictly speaking, the expression "hiding power" should only be applied to paint formulae, i. e. to mixtures of pigment and vehicle. Nevertheless, pigments may be said to possess potential hiding power and the potential hiding power of a pigment in a flat paint formulation may be considered to be its flat hiding power. This flat hiding power is defined as follows:

$$\text{F. H. P.} = \frac{\text{Wt. standard pigment per unit vol. standard paint}}{\text{Wt. sample pigment per unit vol. sample paint}} \times \text{H. P.}$$

in which F. H. P. is the flat hiding power of the sample pigment and H. P. is the hiding power of the sample flat paint as determined by the hereinbefore described "Krebs dry film incomplete hiding power" procedure.

*Oil absorption*

Oil absorption is the amount of oil in grams required to wet 100 grams pigment.

The method of testing is described on pages 540–541 of Gardner's above cited book.

A five gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

This invention has as an object the production of colored pigments the surface hiding power of which has been increased to an extent heretofore unrealized. A further object is to produce colored pigments having flat hiding powers markedly higher than those realized heretofore. A still further object is to increase the opacifying power of colored pigments employed as paper fillers and in paper coating. A still further object is to increase the oil absorption of colored pigments. A still further object is to increase colored pigment dry bulking value, i. e., the volume per unit weight of dry pigment. Additional objects will become apparent from an examination of the following description and claims.

These objects are attained according to the herein described invention which broadly comprises mixing with an aqueous suspension of a colored pigment a water soluble acid and a member selected from the group consisting of alkali metal silicates, cellulose xanthate, cellulose dissolved in alkali metal hydroxide solution, and urea cellulose dissolved in alkali metal hydroxide solution, thereby forming on the colored pigment particles a gel-like coating, and thereafter dewatering the suspension and drying the colored pigment so treated.

In a more restricted sense this invention comprises mixing with an aqueous suspension of a colored pigment between about 0.25% and about 35%, based upon the weight of the pigment before treatment and calculated as $SiO_2$ or cellulose according to the treating agent employed, of a treating agent selected from the group consisting of alkali metal silicates, cellulose xanthate, cellulose dissolved in alkali metal hydroxide solution, and urea cellulose dissolved in alkali metal hydroxide solution. After the slurry has been agitated sufficiently to insure uniform distribution of the added agent, it is acidified, thereby forming a gel-like coating on said pigment particles, and thereafter dewatering the suspension and drying the coated colored pigment without calcination.

The preferred embodiment of this invention comprises mixing with an aqueous suspension of a colored pigment, comprising an excess of about 250 grams of said pigment per liter, between about 1% and about 8%, based upon the weight of the pigment before treatment and calculated as $SiO_2$ or cellulose according to the treating agent employed, of a treating agent selected from the group consisting of sodium silicate, cellulose xanthate, and urea cellulose. After the slurry has been agitated sufficiently to insure uniform distribution of the added agent it is acidified by the addition of sulfuric acid thereby forming a gel-like coating on said pigment particles, and thereafter dewatering the suspension and drying the coated colored pigment. When the agent employed is sodium silicate I prefer to dry the pigment at a temperature between about 110° C. and about 175° C. When I employ cellulose xanthate or urea cellulose as my treating agent I prefer to dry the pigment at a temperature between about 110° C. and about 130° C.

The following examples are given for illustrative purposes and are not intended to place any restrictions or limitations on the herein described invention.

Example I

Sodium silicate solution, containing 23.5% $SiO_2$ and having a $SiO_2:Na_2O$ ratio of 3.8:1, was added to a water suspension of ultramarine blue in the amount of 2% $SiO_2$ on the basis of the weight of the ultramarine blue. After being agitated sufficiently to insure even distribution of the sodium silicate, the slurry was acidified to a pH of 6.5, filtered and the treated ultramarine blue dried at 120° C. and disintegrated by passing it through a squirrel cage disintegrator.

My novel process, as hereinabove exemplified, increased the dry bulking value of the ultramarine blue by 22% and increased its oil absorption by 36%, its flat hiding power in a representative flat paint formulation by 54%, its tinting power in a casein paper coating composition by 37% and its opacifying and tinting power as a paper filler by 23%.

Example II 1,430 grams cellulose xanthate solution comprising 7% cellulose and 6% NaOH, was added to 5 liters of an aqueous slurry of red iron oxide containing 2,000 grams of said oxide, i. e. the oxide was treated with 5% cellulose. Dilute sulfuric acid was added to lower the pH to 6 and precipitate the cellulose on the surface of the oxide. Bromine water was added in sufficient amount to bleach out the yellow tinge imparted by the xanthate. The resultant slurry was filtered and the treated oxide dried at 105° C. and disintegrated by passing it through a squirrel cage disintegrator. The treated oxide had an oil absorption of 25 whereas said oxide untreated had an oil absorption of 14. Furthermore, my novel process, as hereinabove exemplified, increased the dry bulking value of the red iron oxide by 60% and increased its flat hiding power in a representative flat paint formulation by 63%, its tinting power in a casein paper coating composition by 54% and its opacifying and tinting power as a paper filler by 29%.

Various arrangements and selections of equipment for the operation of my novel process are possible. In the preferred arrangement, however, I add 8%, on the basis of the pigment, of a sodium silicate solution comprising 23.5% $SiO_2$ and 6.2% $Na_2O$, to a thick suspension of a colored pigment in water in a mechanically agitated tank. The suspension is agitated sufficiently to insure complete dispersion of the sodium silicate and is then acidified with sulfuric acid for example precipitating gel-like silica on the surface of the pigment particles. The colored pigment thus treated is filtered, dried at about 140° C. and after dry milling to break up lumps formed on drying is ready for use.

It is to be understood that the hereinbefore described specific embodiments of my invention may be subject to variation and modification without departing from the scope of this invention. For instance, while the invention has been described with particular application to the treatment of ultramarine blue and red iron oxide, the treatment of other types of colored pigment materials is also contemplated. Accordingly, the term "colored pigment" as employed herein and in the appended claims includes not only ultramarine blue and chrome yellow but also those colored pigment materials such as basic zinc chromate, chrome red, chrome orange, chrome green, barium chromate, iron blue, earth colors such as iron oxide, extended colors and the like.

It is still further to be understood that the treating agent employed may be one or any combination of solutions of cellulose xanthate, cellulose in alkali metal hydroxide solution, urea cellulose in alkali metal hydroxide solution, and water soluble silicates such as the water soluble silicates of sodium, potassium, rubidium, cesium, and the like. The alkali metal silicates when employed in my novel process, upon acidification are precipitated on the colored material particles as a gel-like coating of silica. On the other hand the aforementioned cellulose derivatives upon acidification form coatings of gel-like cellulose on said particles. However, because of the superior results obtained therewith, the silicate solutions which I prefer to employ are those of the water soluble sodium silicates, preferably a sodium silicate having a $SiO_2:Na_2O$ ratio of about 3.8:1 by weight. Urea cellulose used in accordance with the herein described invention is produced according to the process described in U. S. Patent No. 2,134,825.

It is still further to be understood that a coating of gel-like silica or cellulose may be formed on the colored pigment material particles by any of the processes well-known in the art whereby a major part, i. e. 50% or more, of the $SiO_2$ or cellulose is deposited on the surface of said pigment particles, more particularly by acidification of the pigment suspension. In most instances, I prefer to add the treating agent to a pigment suspension comprising not less than about 200 grams and preferably not less than about 250 grams of pigment per liter, and, thereafter, to precipitate the resultant compound on the pigment particles by addition of a water soluble acid, such as sulfuric acid, hydrochloric acid, a phosphoric acid, and the like. However, I may practice the herein described invention by addition of the aforementioned treating agents to a previously acidified pigment suspension, although on account of the ease of manipulation, and the superior results ordinarily obtained thereby, I usually prefer to add the acid after addition of the soluble agent. In any case, it is desirable that the pigment suspension after treatment with a solution of the aforementioned soluble agent and the acid should have a pH of less than about 7 and preferably less than about 6. After the treating agent has been precipitated on the colored pigment particles by the reaction with the acid to provide a pigment suspension having a pH of less than about 7, and preferably less than about 6, I have found it desirable to adjust the pH of said pigment suspension to more than about 6 and preferably more than about 7, prior to the dewatering of said suspension, such as by the addition of an alkaline reacting material such as barium hydroxide, sodium carbonate, and the like.

It is still further to be understood that the amount of treating agent required by a given pigment material can best be learned by experimental trial and the amount will vary with the treating agent, the type and previous history of the pigment material, the precipitating conditions, and the properties desired in the finished colored pigment. With the agents which I have found most satisfactory, viz., sodium silicate, cellulose xanthate and urea cellulose, appreciable effects are obtained by addition of said agent in an amount corresponding to as little as about 0.25% and in an amount equivalent to as high as about 35%, calculated as $SiO_2$ or cellulose according to which agent is employed, and based upon the weight of the pigment in the slurry. For optimum effects, however, I prefer to add the aforesaid agents in an amount equivalent to from about 1% to about 8%. Percentages of gel-like structure materials higher than about 35% result in decreased surface hiding power.

It is still further to be understood that drying of the colored pigment coated with the gel-like compound is an essential step in my novel process. It is essential that the pigment after being coated with the gel-like agent should not be heated to calcination temperatures. I have found it desirable when using an alkali metal silicate as my treating agent to dry the coated pigment at a temperature not in excess of about 300° C. and preferably not in excess of about 200° C. However, as stated herein the preferred drying temperature when using the aforesaid agent is between about 110° C. and about 175° C. When using the herein cellulose derivatives as my treating agent I prefer to dry the colored pigment coated with the gel-like structure of cellulose at a temperature not in excess of about 200° C. and preferably between about 110° C. and 130° C. Temperatures of less than about 100° C. should be avoided unless a pigment is dried at sub-atmospheric pressures.

The herein described process imparts to pigment materials a new property which I call surface hiding power. The treating agent forms an amorphous gel surounding the pigment particles. Upon drying this leaves a system of pigment particle aggregates stabilized by a skeleton structure of the gel. Thus the treated pigment is more porous and bulky than the untreated pigment. As a consequence of my novel treatment there are imparted to pigment materials, not only the property of surface hiding power, but also the properties of hitherto unrealized high flat hiding power, high dry bulking value, high oil absorption, and high opacifying and tinting power in paper and in coating compositions of casein, starch, glue and the like applied to the surface of paper.

My process possesses advantages not previously combined in a single process. Furthermore, the product of my process possesses advantages not previously combined in a pigment material. The high surface hiding pigment resulting from the operation of my process, when used in flat paint formulations, imparts heretofore unrealized high hiding to the dry paint films. Such paint formulations are prepared at essentially the same cost and are far superior to flat paints hitherto manufactured. Furthermore, the novel pigment products of my invention, when employed as paper fillers or in compositions of starch, casein, glue and the like applied to the surface of paper, produce papers which are definitely superior in opacity and color to those pigmented in an analogous manner with corresponding prior art pigments.

Minor increases in surface hiding power are of little industrial importance. Therefore, the colored pigments produced according to my novel process, as compared with prior art pigments have an increase of at least about 10%, and preferably at least about 15%, in flat hiding power, dry bulking value, and oil absorption. Further the opacifying and tinting power of coatings of casein, starch, and the like when applied to paper is increased at least about 10% and preferably at least about 15%.

It is to be understood that the increase in flat hiding power mentioned hereinabove refers to the percentage increase in flat hiding power of a treated pigment as compared to the same pigment before treatment by my novel process. This is determined according to the hereinbefore described pigment flat hiding power test in a flat paint composition comprising 25.8% pigment by volume, 25.92% 50 gal. limed rosin varnish, 4.18% acid refined linseed oil of acid No. 5, and 44.1% petroleum spirits.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for producing a colored pigment of improved surface hiding power which comprises mixing with an aqueous suspension of a colored pigment between about 0.25% and about 35%, calculated as $SiO_2$ and based upon the weight of the pigment before treatment of a sodium silicate solution, acidifying the slurry, dewatering, and drying at a temperature not in excess of about 300° C.

2. A colored pigment of improved surface hiding power which comprises a colored pigment coated with uncalcined gel-like silica in an amount in the range of from about 0.25% to about 35%, calculated as $SiO_2$ and based on the weight of the pigment before treatment.

3. A process for producing a colored pigment of improved surface hiding power which comprises mixing an aqueous suspension comprising a water soluble silicate, a colored pigment, and an acidic reagent, thereby precipitating silica as a gel-like coating on the pigment particles, dewatering the suspension and drying the pigment material without calcination.

4. A process for producing a colored pigment of improved surface hiding power which comprises mixing an aqueous suspension comprising a water soluble silicate, ultramarine blue, and an acidic reagent, thereby precipitating silica as a gel-like coating on the pigment particles, dewatering the suspension and drying the pigment material without calcination.

5. A process for producing a colored pigment of improved surface hiding power which comprises mixing an aqueous suspension comprising a water soluble silicate, chrome yellow, and an acidic reagent, thereby precipitating silica as a gel-like coating on the pigment particles, dewatering the suspension and drying the pigment material without calcination.

6. A process for producing a colored pigment of improved surface hiding power which comprises mixing with an aqueous suspension of a colored pigment between about 0.25% and about 35%, calculated as $SiO_2$ and based on the weight of the pigment before treatment, of a water soluble silicate, acidifying the slurry, dewatering said slurry and drying the pigment at a temperature not in excess of about 300° C.

7. A process for producing a colored pigment of improved surface hiding power which comprises mixing with an aqueous suspension of ultramarine blue between about 0.25% and about 35%, calculated as $SiO_2$ and based on the weight of the pigment before treatment, of a water soluble silicate, acidifying the slurry, dewatering said slurry and drying the pigment at a temperature not in excess of about 300° C.

8. A process for producing a colored pigment of improved surface hiding power which comprises mixing with an aqueous suspension of chrome yellow between about 0.25% and about 35%, calculated as $SiO_2$ and based on the weight of the pigment before treatment, of a water soluble silicate, acidifying the slurry, dewatering said slurry and drying the pigment at a temperature not in excess of about 300° C.

9. A process for producing a colored pigment of improved surface hiding power which comprises mixing with an aqueous suspension of a colored pigment between about 1% and about 8%, calculated as $SiO_2$ and based on the weight of the pigment before treatment, of a water soluble silicate, acidifying the slurry by the addition of sulfuric acid, and subsequently dewatering the slurry and drying the pigment at a temperature not in excess of about 200° C.

10. A process for producing a colored pigment of improved surface hiding power which comprises mixing with an aqueous suspension of a colored pigment between about 1% and about 8%, calculated as $SiO_2$ and based on the weight of the pigment before treatment, of a water soluble silicate, acidifying the slurry by the addition of sulfuric acid, and subsequently dewatering the slurry and drying the pigment at a temperature between about 110° C. and about 175° C.

11. A process for producing a colored pigment of improved surface hiding power which comprises mixing with an aqueous suspension of a colored pigment between about 1% and about 8%, calculated as $SiO_2$ and based on the weight of the pigment before treatment, of sodium silicate, said sodium silicate having an $SiO_2:Na_2O$ ratio of about 3.8:1 by weight, acidifying the slurry by the addition of sulfuric acid, and subsequently dewatering the suspension and drying the pigment at a temperature between about 110° C. and about 175° C.

12. A colored pigment of improved surface hiding power which comprises a colored pigment coated with uncalcined gel-like silica.

13. A colored pigment of improved surface hiding power which comprises a colored pigment coated with uncalcined gel-like silica in an amount in the range of from about 1% to about 8%, calculated as $SiO_2$ and based on the weight of the pigment before treatment.

14. A colored pigment of improved surface hiding power which comprises ultramarine blue coated with uncalcined gel-like silica in an amount in the range of from about 1% to about 8%, calculated as $SiO_2$ and based on the weight of the pigment before treatment.

15. A colored pigment of improved surface hiding power which comprises chrome yellow coated with uncalcined gel-like silica in an amount in the range of from about 1% to about 8%, calculated as $SiO_2$ and based on the weight of the pigment before treatment.

MARION L. HANAHAN.